United States Patent [19]

Sennett et al.

[11] Patent Number: 5,061,461
[45] Date of Patent: Oct. 29, 1991

[54] CATIONIC PROCESSING OF KAOLIN ORES

[75] Inventors: Paul Sennett, Colonia; Steven A. Brown, New Brunswick, both of N.J.

[73] Assignee: Engelhard Corporation, Iselin, N.J.

[21] Appl. No.: 570,990

[22] Filed: Aug. 22, 1990

Related U.S. Application Data

[63] Continuation of Ser. No. 347,611, May 4, 1989, abandoned.

[51] Int. Cl.[5] .............................................. C09D 3/20
[52] U.S. Cl. .................................. 423/112; 210/727; 427/361
[58] Field of Search ........................................ 423/112

[56] References Cited

U.S. PATENT DOCUMENTS

| | | | |
|---|---|---|---|
| 1,233,713 | 7/1917 | Schwerin | 209/5 |
| 1,324,958 | 12/1919 | Feldenhelmer | 501/149 |
| 3,014,836 | 12/1961 | Proctor | 501/150 |
| 3,021,195 | 2/1962 | Poaschus et al. | 423/328 |
| 3,309,214 | 3/1967 | Podschus et al. | 106/486 |
| 3,519,453 | 7/1970 | Morris et al. | 501/150 |
| 3,586,523 | 6/1971 | Fanselow et al. | 10/486 |
| 3,594,203 | 7/1971 | Sawyer et al. | 106/487 |
| 3,736,165 | 5/1973 | Sawyer | 106/487 |
| 3,804,656 | 4/1974 | Kaliski et al. | 106/487 |
| 3,893,915 | 7/1975 | Mercade | 209/166 |
| 3,915,391 | 10/1975 | Mercade | 241/20 |
| 3,980,240 | 9/1976 | Nott | 241/20 |
| 3,990,642 | 11/1976 | Nott | 241/20 |
| 3,994,806 | 11/1976 | Rausch et al. | 210/728 |
| 4,106,949 | 8/1978 | Malden | 501/148 |
| 4,165,840 | 8/1979 | Lewis et al. | 241/20 |
| 4,174,279 | 11/1979 | Clark et al. | 210/736 |
| 4,182,785 | 1/1980 | Price | 501/147 |
| 4,186,027 | 1/1980 | Bell et al. | 501/147 |
| 4,210,488 | 7/1980 | Reuss et al. | 162/162 |
| 4,272,297 | 6/1981 | Brooks et al. | 106/465 |
| 4,381,948 | 5/1983 | McConnell et al. | 501/145 |
| 4,548,733 | 10/1985 | Vincent | 106/503 |
| 4,610,801 | 9/1986 | Matthews et al. | 252/181 |
| 4,711,727 | 12/1987 | Matthews et al. | 210/728 |
| 4,738,726 | 4/1988 | Pratt et al. | 209/5 |
| 4,767,466 | 8/1988 | Nemeh et al. | 106/487 |
| 4,772,332 | 9/1980 | Nemeh et al. | 106/487 |
| 4,820,424 | 4/1989 | Field et al. | 210/716 |

FOREIGN PATENT DOCUMENTS 0281134 3/1988 European Pat. Off. .

OTHER PUBLICATIONS

Coco, "Soy Protein Latex Interpolymers—Properties and Function", Coating Conference, 1987, pp. 133-140.

Primary Examiner—Peter D. Rosenberg

[57] ABSTRACT

A method for recovering a fine particle size fraction of a negatively charged mineral from an ore, such as a kaolin clay crude, which comprises forming an aqueous pulp of the ore, dispersing the pulp by adding thereto sufficient water-soluble organic cationic dispersant to impart a positive zeta potential to said particles and, preferably, an acidic pH to said pulp, removing coarse particles from said dispersed pulp and fractionating the dispersed pulp to separate a fine particle size fraction of mineral particles from coarser particles.

20 Claims, 1 Drawing Sheet

FIG.1

CATIONIC PROCESSING OF KAOLIN ORES

RELATED APPLICATIONS

This is a continuation of copending application Ser. No. 07/347,611 filed on May 4, 1989, abandoned.

This application is related to U.S. Ser. No. 07/347,834 filed concurrently, U.S. Ser. No. 07/347,612, also filed concurrently.

FIELD OF THE INVENTION

This invention relates to the art of upgrading kaolin clay crudes by processing which includes treating an aqueous suspension of the crude with a dispersant before carrying out steps to produce refined mineral products. In particular, the invention relates to processing aqueous suspensions of kaolin clay crudes to provide refined kaolin clay products using cationic dispersants, preferably at acidic pH, throughout the processing.

BACKGROUND OF THE INVENTION

Minerals almost invariably occur in nature in ores which contain a variety of materials in addition to the particular mineral constituent that is to be marketed. The nondesired mineral matter may be, for example, an impurity or a particle size fraction of the desired mineral that is too coarse (or too fine) for an intended use. Especially where the desired mineral material is very finely divided, for example, a material having an appreciable content of particles finer than 2 micrometers, it is conventional to disperse the ore in water to form an aqueous pulp before attempting to upgrade (beneficiate) the ore. Dispersion (deflocculation) is practiced to fluidize mineral pulps and it enhances the separation of individual mineral particles from others by increasing the electrical charge on the individual particles.

Anionic dispersants such as condensed phosphates and sodium silicate are frequently used to fluidize ore pulps containing negatively charged mineral particles at near neutral to mildly alkaline pH values (e.g., pH 6-9) without the need to consider the effect of using such dispersants on subsequent processing. An exception is the case of finely mineralized ores such as kaolin clay crudes in which chemical treatment after dispersion is frequently essential and the presence of the particular dispersant used to upgrade the ore may result in undesirable interaction between dispersant and subsequently or previously added reagents. See, for example, U.S. Pat. No. 3,594,203 (Sawyer et al).

Naturally-occurring sources of kaolin, generally known as kaolin crudes, such as those mined in Georgia, U.S.A. and Cornwall in England, are processed to recover upgraded kaolin products. Many Georgia crudes contain well-crystallized finely divided particles of kaolin having a median particle size of about 1.5 micrometers in association with silica and silicate impurities as well as colored ferruginous and titaniferous impurities. Other commercially important Georgia crudes contain less well-crystallized kaolin which are finer in particle size, e.g., median size below 1 micrometer. The Cornwall crudes typically contain only about 10% to 15% kaolin which is coarser than the kaolin in the Georgia deposits. Vast tonnages of such kaolin crudes are mined for the ultimate recovery of purified grades of kaolin having a higher brightness and different particle size distribution than that of the kaolin in the crude. The processing, frequently referred to as "wet processing", almost invariably involves crushing the kaolin crude, pulping the crushed crude in water, removing coarse impurities (so-called grit), fractionating the degritted crude to recover one or more fractions of desired particle size distribution, bleaching to brighten one or more of the fractions of kaolin, filtration and washing. In some cases, additional upgrading to remove colored impurities by flotation, selective flocculation and/or magnetic purification is practiced and usually takes place before filtration. Such additional upgrading also takes place when the clay is in the form of a dispersed pulp.

When kaolin crudes are mixed in water without addition of dispersant the resulting pulps are usually mildly acidic, typically having a pH of 4-6 and the kaolin particles are negatively charged. To the best of our knowledge, one or more anionic dispersants are invariably added to a pulp of the crude to create near neutral or mildly alkaline systems before degritting and fractionation. When these steps are followed by bleaching with a reducing bleach, usually a hydrosulfite (dithionite) salt, the previously dispersed alkaline pulp of clay is first flocculated by adding an acid or alum to pH 3-5 because such bleaches are generally more effective at acidic pH values and flocculation aids subsequent filtration. However, the added acid or alum interacts with the dispersant to form salts which are frequently deleterious to performance properties of the kaolin product. After flocculation, the bleached clay, in the form of a filter cake, must usually be washed to reduce salt content. Filtration and washing add considerably to the cost of processing. Subsequent processing depends on the form in which the purified kaolin is to be supplied. So-called "predispersed grades" are usually manufactured by adding a dispersant to the previously flocculated clay to form a high solids slurry (e.g., 65-70%) which is spray dried to provide a dry product containing a dispersant. The production of slurried grades also entails the addition of dispersant(s). Dispersant(s) added to previously dispersed and flocculated clay are generally termed "secondary" dispersants to distinguish them from dispersants used to prepare pulps for degritting, fractionation, etc., which are generally referred to as "primary" dispersants. Acid grades of wet processed kaolins are produced without secondary dispersion of acid-flocculated filtered clay.

The history of using alkali or negatively charged material as primary dispersants for negatively charged clay dates at least back to 1912 (U.S. Reissue Pat. No. 14,583, Scherwin). This patent teaches using "electrolytes containing ions of an electric character which is the same as the character of the part of the composite mass which it is desired shall remain in suspension in sol-condition". This concept is pursued in Scherwin's subsequent patent (U.S. Pat. No. 1,233,713), which discloses fractional sedimentation of kaolin in a dispersed system. An advance is reflected in U.S. Pat. No. 1,324,958 (Feldenheimer) in which an acidic material is used to neutralize the alkaline deflocculating agent and to floc the clay in order to settle materials not ordinarily settled in a deflocculated condition. Subsequent patents disclose particle size fractionation of kaolin in dispersed state in centrifuges, usually followed by flocculation by acid addition, filtration and washing of the filter cake. A major advance in the development of the kaolin industry was reflected in the establishment of a 2 micrometers particle size cut-off point when fractionating kaolins to prepare paper coating clay and the use of centrifuges to carry out the desired fractionation of the crude clay. Crudes having a median particle size of 1.5 micrometers are conventionally classified in centrifuges to recover premier coating grades (at least 90% by weight finer than 2 micrometers) and coarse filler kaolin having a median size of 4-6 micrometers. A major present use of kaolin crudes is as a source of bleached minus 2 micrometers fractions of kaolin clay supplied principally for the paper coating industry.

The growth of the kaolin industries in the U.S. and abroad has also generated many other innovations including the use of a variety of primary dispersants, all anionic, and including sodium silicates, silicate hydrosols, condensed phosphate salts, polyacrylate salts, and "auxiliary" dispersants such as sulfonates.

Similarly, the art of producing carbonate pigments and fillers from naturally-occurring dolomitic and calcitic ores by processes utilizing wet milling and wet particle size classification has used anionic dispersants, exemplified by sodium polyacrylates, added, for example, during grinding, followed in some instances by flocculation. See, for example, U.S. Pat. No. 3,980,240 (Nott), U.S. Pat. No. 3,990,642 (Nott), and U.S. Pat. No. 4,165,840 (Lewis et al).

The concept of using a negatively charged dispersant (sodium silicate, mixtures thereof with sodium carbonate, or hydrosols derived from sodium silicate) in the froth flotation of kaolin has been extended to other finely mineralized negatively charged mineral oxide and silicate ores, for example, talc ores, tin (cassiterite) ores, (U.S. Pat. No. 3,915,391, Mercade), fluorspar ores (U.S. Pat. No. 3,893,915, Mercade) and scheelite (tungsten) ores, (U.S. Pat. No. 3,915,391, Mercade).

Cationic surfactants have been disclosed as a means to disperse various clays in organic liquids. See, for example, U.S. Pat. No. 2,797,196, Dunn et al.

In accordance with U.S. Pat. No. 3,804,656, Kaliski, et al, a negatively charged filler or pigment such as kaolin is dispersed with a combination of nonionic and cationic surface active agents at a strongly alkaline pH. The cationic material is not added as a primary dispersant nor is it present during wet processing.

U.S. Pat. No. 4,738,726, Pratt et al, discloses high bulking pigments obtained by adding a cationic polyelectrolyte to previously degritted and fractionated kaolin clay to partially flocculate the clay. Anionic primary and secondary dispersants are used and the cationic material is used to partially flocculate, not to disperse the clay.

U.S. Pat. No. 4,210,488 (Reus et al) discloses addition of a cationic polymer (polypiperidine halide) "absorbed" on a fine particle carrier such as kaolin to improve the dry strength of paper or to improve the effect of optical brighteners. The absorbed polymer is said to create a positive charge on the kaolin particles. The cationic material is not added during wet processing of the carrier.

Numerous publications make reference to the addition of cationic polyelectrolytes to paper coating composition containing mineral pigments such as clay or calcium carbonate to improve the coating structure by imparting a bulked structure. See, for example, Coco, C.E., Soy Protein Latex Interpolymers—Properties and Function, Preprints TAPPI Coating Conference 1987.

EPA 281,134 (Weige) relates to cationic pigment dispersion, especially for producing paper coating compositions, containing a pigment component, a cationised polymer, which encloses the pigment particles as a protective colloid, and optionally a cationic polymer and/or ammonium compound as dispersant for the coated pigment particles. The cationic polymer PVA increases the zeta potential of the dispersion to the isoelectric point or into the cationic region. The pigment can be ground or precipitated calcium carbonate, (calcined) kaolin, $TiO_2$, $ZnO$, satin white, aluminum hydrosilicates or their mixtures.

In commonly assigned copending application U.S. Ser. No. 07/347,612, filed concurrently herewith, cationically processed kaolin crude of the type described in U.S. Pat. No. 3,586,523 (Fanselow et al) is calcined to provide an improved high brightness, low abrasion kaolin opacifying pigment useful for coating or filling paper or an ingredient of paints or plastics. Our copending patent application, U.S. Ser. No. 07/309456 filed Feb. 10, 1989, describes the use of cationic polymers and the like as secondary dispersants for slurrying calcined kaolin pigments.

To the best of our knowledge, the prior art does not disclose or suggest the use of cationics as primary dispersants for kaolin or other ores.

SUMMARY OF THE INVENTION

The present invention comprises a process for upgrading a naturally-occurring ore containing negatively charged mineral particles which features the use of a water-soluble organic cationic primary dispersant and involves adding a sufficient quantity of cationic dispersant, preferably a cationic polyelectrolyte, to an aqueous ore pulp to impart a positive electrical charge to the normally negative charged mineral particles. The cationically dispersed pulp is then upgraded to recover mineral particles or a desired portion thereof.

In the presently preferred embodiments, the invention is directed to a novel method for upgrading kaolin clay crudes wherein the crude is upgraded by wet processing in the presence of a primary dispersant which is a cationic material used in dispersant effective quantity, preferably at an acidic pH.

Pursuant to one aspect of the invention, the crude kaolin clay is subjected to processing including degritting, fractionation and bleaching with a hydrosulfite salt, all of these steps being carried out while a pulp of the clay is cationically dispersed at an acidic pH which, as mentioned, is desirable for effective bleaching. Most preferably, anionic dispersants or added basic materials are not present during any of these steps. The processing takes advantage of the fact that the cationically dispersed slurry of degritted fractionated kaolin is already acidic when the clay is in a condition suitable for bleaching. In conventional kaolin processing, the anionically dispersed clay is flocculated with acid before bleaching and the added acid interacts with the primary anionic dispersant(s) to form salts. Since, in the present invention, the kaolin is already at an acid pH, no separate acid addition is required. Thus, the process of the present invention would be expected to result in a bleached kaolin slurry with a lower quantity of deleterious soluble salts. Further, in practice of our invention the clay is dispersed and therefore bleaching can be carried out at solids higher than those that can be effectively employed when bleaching flocculated slurries.

The pulp of fractionated (or fractionated and bleached) clay may then be spray dried to produce a dry kaolin product which, when added to water, results in a cationically dispersed clay product. A small amount of additional cationic dispersant may be required before spray drying.

When carried out at high solids, such processing avoids the need to employ filtration and washing steps which add significantly to the cost of the conventional wet processing of kaolin crudes.

In another embodiment, slurries of the cationically dispersed acidic slip of bleached fine clay, wet processed in accordance with this invention at lower solids, is flocculated by adding an anionic material which neutralizes the cationic dispersant. The flocced clay system is filtered to produce a filter cake which is washed and then fluidized by adding a secondary dispersant which may be either cationic (to produce an acidic cationically dispersed high solids slurry of beneficiated clay intended for shipment in that form) or anionic (to produce an anionically dispersed high solids slurry of anionically dispersed clay intended for shipment in that form.)

BRIEF DESCRIPTION OF THE DRAWING

One embodiment results in cationically predispersed dry clay (A); another results in a high solids slurry of cationically dispersed clay (B); a third results in a high solids slurry of anionically predispersed dry clay (C); and a fourth results in a high solids slurry of anionically dispersed clay (D). The term "predispersed" is used herein in the conventional sense, i.e., a dry product which when mixed with water results in a slurry in which the kaolin particles are in a dispersed condition without further addition of dispersant.

DETAILED DESCRIPTION OF PREFERRED EMBODIMENTS

Figure 1:
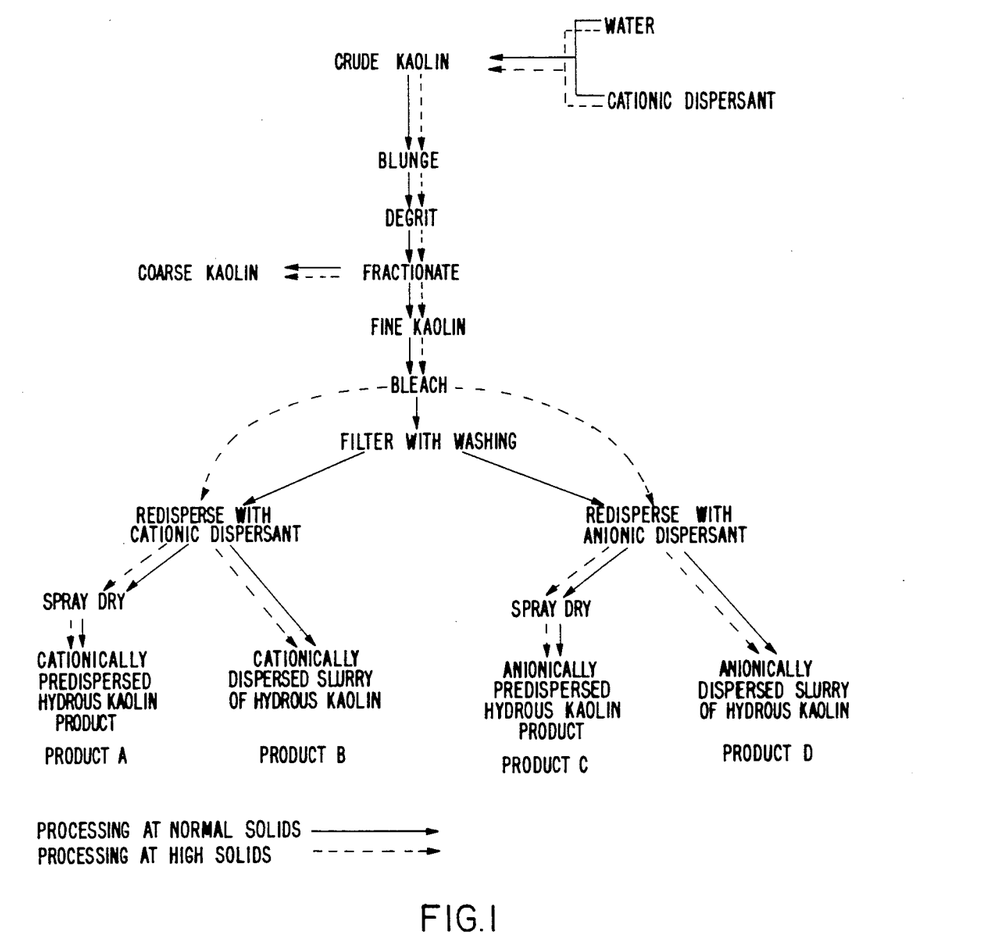
The accompanying figure illustrates embodiments for upgrading kaolin crude, all utilizing a cationic material for primary dispersion.

This invention is described in connection with its utility in upgrading kaolin crudes. The figure illustrates the processing steps used to produce various cationically processed kaolin pigments that result in cationic as well as anionic pigments.

The process of the present invention is conveniently carried out by adding a dispersant effective amount of one or more cationic materials to the required amount of water for the desired solids in a vessel equipped with a stirrer. Once the cationic dispersant has dissolved, the crushed kaolin crude is added slowly with sufficient agitation to give a well dispersed fluid suspension. If necessary, the slurry may be passed through a sieve or other conventional degritting apparatus such as a "sandbox" to remove undispersed aggregates or coarse impurities.

A crude kaolin cationically dispersed and degritted at a high solids level of 55% to 65% may be further upgraded at high solids by subsequent centrifugation steps to classify the kaolin into more desirable particle size fractions. Since the cationically dispersed kaolin slurries are at an acidic pH ranging from 3.0 to 5.0, reducing bleaches such as sodium dithionite may be added directly, using the same quantities used in conventional anionic processing systems which normally range from 4 lb. to 15 lb./ton active bleach (based on the weight of the dried kaolin in the slurry.) Bleaching improves the color properties of kaolin pigments. The kaolin slurry is then spray dried directly after bleaching thereby eliminating a costly filtration step necessary in low solids processing. The spray dried material is a cationically predispersed hydrous dry kaolin (PRODUCT A in the figure) product. When Product A is added to a bleached slurry of cationically processed clay to increase the solids content, the result is a high solids cationically dispersed hydrous kaolin slurry product (e.g., above 50%) with a pH ranging from 3.0 to 5.0 (PRODUCT B in the figure).

As shown in the accompanying figure, pigments similar to those processed at high solids to produce A and B, may also be produced by a low solids process, ranging from 20% to 30% slurry solids; however, a slurry filtration step is necessary to increase the solids content prior to spray drying or to produce a high solids cationically dispersed hydrous kaolin slurry.

Anionic pigments can be produced from cationically processed kaolin by adding anionic dispersing agents after the bleaching step. To prepare such pigments, appropriate anionic dispersing agents such as alkali silicates (sodium silicate), sodium polyacrylates, tetrasodium pyrophosphate, etc. may be added to the cationic slurries individually or in various combinations in amounts adequate to render a charge reversal of the pigment to negative. The addition of anionic materials to effect charge reversal may be carried out using either low or high solids slurries. When added to high solids slurry a costly filtration step is eliminated and the slurry is sent directly to the spray drier which produces a dry anionically predispersed hydrous kaolin product (PRODUCT C in the figure). In low solids processing, sufficient anionic dispersant is added to flocculate the slurry which is then filtered with subsequent water washing of the filtercake. The filtercake is redispersed with a secondary dispersant (anionic) to produce a high solids anionically dispersed slurry of hydrous kaolin (PRODUCT D in the figure).

Presently preferred primary cationic dispersants (or secondary cationic dispersants, when used) are water soluble cationic polyelectrolytes. See, for example, U.S. Pat. No. 4,174,279. Cationic polyelectrolytes are characterized by a high density of positive charge. Positive charge density is calculated by dividing the total number of positive charges per molecule by the molecular weight. Generally the high charge density of polyelectrolytes exceeds $1 \times 10^{-3}$ and such materials do not contain negative groups such as carboxyl or carbonyl groups. In addition to the alkyl diallyl quaternary ammonium salts, other quaternary ammonium cationic polyelectrolytes are obtained by copolymerizing aliphatic secondary amines with epichlorohydrin. See U.S. Pat. No. 4,174,279. Still other water-soluble cationic polyelectrolytes are poly(quaternary ammonium) polyester salts that contain quaternary nitrogen in a polymeric backbone and are chain extended by the groups. They are prepared from water-soluble poly(quaternary ammonium salts) containing pendant hydroxyl groups and bifunctionally reactive chain extending agents; such polyelectrolytes are prepared by treating an N, N, N$^{(1)}$, N$^{(1)}$ tetraalkylhydroxyalkylenediamine and an organic dihalide such as a dihydroalkane or a dihaloether with an epoxy haloalkane. Such polyelectrolytes and their use in flocculating clay are disclosed in U.S. Pat. No. 3,663,461. Other water soluble cationic polyelectrolytes are polyamines. Polyamines are usually supplied commercially under trade designations; chemical structure and molecular weight are not provided by the suppliers.

The aforementioned cationic dispersants are known when used at appropriate dosages to partially flocculate negatively charged clays. See, for example, U.S. Pat.

No. 4,738,726 (Pratt et. al.), and references cited therein. It should be noted that as incremental dosages of such cationic materials are added to anionically charged particles, the initial effect is that of flocculation. As dosages increase beyond the levels at which flocculation occurs, dispersion (deflocculation) occurs and the charge on the particles becomes positive. Charge may be determined by the use of the Lazer Zee Meter, Model 501, manufactured by PEN KEM, Inc; other zeta potential measuring devices can be used.

Cationic dispersants used in practice of this invention also include low molecular weight polyamines (e.g., ethylene diamine or hexamethylene diamine), long carbon chain amines or quaternary ammonium salts (e.g., "dimethylditallow" ammonium chloride). Foaming may be a problem with surface active quaternary ammonium compounds such as dimethylditallow ammonium chloride.

The amount of cationic dispersant required depends on the nature of the cationic dispersant as well as the nature of the surface of the mineral particles. A lower molecular weight diallyl polymer salt is less effective in conferring a cationic charge than is the same polymer of higher molecular weight. Quaternary ammonium polymers of high charge density are more effective than those of lower charge density. Higher surface area, fine particle minerals require more dispersant than do coarser particles. The magnitude of the anionic charge before treatment with the cationic dispersant also affects the amount required. A mineral carrying a high anionic charge will require a greater amount of cationic dispersant than will a mineral which initially has a lower anionic charge.

A dimethyl diallyl quaternary ammonium chloride polymer commercially available under the trademark designation Polymer 261LV from the Calgon Corporation has been found to be particularly useful in the practice of the present invention. The polymer is supplied as an aqueous solution containing approximately 42% active polymer; the supplier estimates the molecular weight of the reagent to be between 50,000 and 250,000. Generally, 0.2 to 0.75 percent active Calgon 261LV is required to disperse crude kaolins in aqueous suspensions in the range of 45% to 60% solids. The particle size distribution and surface area of the kaolin dictate the amount of polymer required to impart cationic dispersion in the slurries. Cationically dispersed kaolin slurries are acidic and pH ranges between 3.0 and 5.0 as measured on a pH meter. Kaolins that have been previously treated with anionic agents require even higher amounts of Calgon 261LV to disperse them cationically.

The following nonlimiting examples are given to illustrate the best modes presently contemplated for practicing this invention.

All particles sizes in these examples in the micrometer size range were determined by a conventional sedimentation technique using the Sedigraph ® 5000 analyzer. All pH values were determined by an Orion Research pH meter (model 701A). All charge values were obtained by use of the Lazer Zee Meter (supra).

When sodium silicate was used in illustrative examples, N ®Brand sodium silicate was employed. N ®Brand sodium silicate is a solution containing about 8.9% wt. $Na_2O$, about 28.7% wt. $SiO_2$ and the balance water.

EXAMPLE 1

This example illustrates the use of cationic dispersion in the wet processing of a Georgia kaolin crude (Washington County, Georgia) of the type conventionally processed using only anionic dispersants to produce a No. 1 grade of paper coating kaolin. The crude kaolin used was a well crystallized kaolin. Typical crude of this type contains about 1.76% wt. titania and about 0.34% wt. iron (as $Fe_2O_3$) as impurities. Median particle size of the degritted kaolin is about 1.6 micrometers (equivalent spherical diameter); about 92% by weight of the particles is <10 micrometers, 80% <5 micrometers, and 56% <2 micrometers. The crushed crude kaolin was received at 78% solids (22% volatiles).

Deionized water (1540 g) was added to a beaker. Using moderate speed stirring provided by a drill press mixer equipped with a 2" uplift stainless steel propeller, 5128 g of the crude kaolin was gradually added to the water with alternate drop-by-drop additions of Calgon 261LV polymer (42% active) until the crude appeared dispersed when examined visually. The slurry was stirred for an additional 90 minutes after combining all of the ingredients. The total amount of cationic polymer added was 0.175% (100% active weight basis) based on the dried weight of the kaolin. Solids content in the dispersed slurry was 60% and the pH was 3.6.

The 60% solids slurry was then diluted to 42% solids by adding 2858 g of deionized water while the slurry was stirred. The slurry pH after dilution was 3.6.

The diluted acidic cationically dispersed slurry was degritted by passing it over a vibrating 325 mesh sieve (U.S.). The >325 mesh portion that collected on top of the screen was set aside and the <325 mesh portion passing through the screen was collected in a beaker. Solids content in the <325 mesh slurry measured after mixing with a spatula was found to be 34.9%, resulting in a 82% yield. The lower than normal yield obtained for the <325 mesh portion may have been caused by an inadequate amount of Calgon 261LV to disperse the crude kaolin sufficiently prior to degritting. A +47 mv zeta potential value was obtained using the Lazer Zee Meter after a portion of the <325 mesh fraction was diluted with supernatant extracted from a separate portion of the same fraction.

The <325 mesh slurry was then fractionated to obtain the <2 micrometers particles by using a conventional gravitational sedimentation method. The slurry was divided equally into two-gallon plastic beakers. The slurry height in each of the beakers was adjusted to 22 cm by adding more deionized water followed by stirring on the drill press. Solids content in each slurry was 17.7%. After permitting the slurries to stand undisturbed for 16 hours, no hard sediment had formed in either beaker, indicating that the slurries were not adequately dispersed. To improve dispersion, 0.05% Calgon 261LV polymer (based on the weight of the dried kaolin) was added to one of the slurries during stirring on the drill press mixer. After permitting the slurry to stand undisturbed for 6 hours, a hard sediment had formed indicating adequate dispersion. The same amount of cationic polymer was then added to the other slurry which resulted in a total of 0.225% (active) polymer addition based on the weight of the dried kaolin in each slurry. Both of these further dispersed slurries were recombined, stirred manually, and redivided into three separate containers. The slurry height in each of the containers was 8 cm. All three slurries were permitted to stand undisturbed for 6 hours before gently pouring out the supernatants. The three supernatants were retained together in a single plastic bucket and the remaining hard sediments at the bottom of each container were diluted by adding approximately 1 liter of deionized water to each one. The sediments were redispersed during stirring on the drill press mixer. The three slurries formed from the sediments were recombined and mixed.

A second gravitational sedimentation was carried out to remove additional <2 micrometers material from the sediments formed by the previous fractionation. The slurry (from sediments) was diluted with enough deionized water to give 8 cm slurry heights after dividing into the same three containers used for the first gravitational sedimentation. The three slurries were permitted to stand undisturbed for 6 hours before gently pouring out the supernatants. The three supernatants were retained in a separate container and the remaining sediments formed in the three containers were transferred to a single 2 gallon plastic beaker.

A third and final gravitational sedimentation was carried out to recover more <2 micrometers material from the sediments formed by the second fractionation. The previously combined sediments were diluted with deionized water until the slurry was 21 cm high in one beaker and after stirring on the drill press mixer the slurry pH was 3.6. After permitting the slurry to stand undisturbed for 16 hours, the supernatant was gently poured out and collected in a separate beaker and the remaining sediment was set aside.

All supernatants retained from the three gravitational sedimentations were mixed together in a single container resulting in a 5.38% solids slurry. The yield of <2 micrometers kaolin was determined to be 1556 g or 47.5% based on <325 mesh fraction.

The <2 micrometers fine fraction kaolin was bleached with 8 lb. of sodium dithionite reducing bleach per ton of dry kaolin. This was performed by sifting 6.225 g of the bleach powder into the slurry during low speed stirring on the drill press mixer. After 5 minutes of mixing the slurry appeared visually brighter. After static aging the slurry for 18 hours its pH was 3.2 and specific conductivity was 0.586 micromhos. A +17 mv zeta potential value was obtained using the Lazer Zee meter after diluting a portion of the bleached slurry with clear supernatant extracted by centrifuging another portion of the main bleached slurry.

A preliminary filtration test was performed by extracting three 100 g samples from the main bleached slurry after aging and mixing. The first sample was filtered "as is" on a Buchner funnel under vacuum using Whatman #5 filter paper. Aside from a few cloudy drops of filtrate at the beginning of the filtration the filtrate was clear. Sodium hydroxide solution (2% active) was added to the second sample to increase pH to 7.0 and after permitting the sample to static age for a few minutes clear supernatant formed at the top portion of the slurry indicating good flocculation of the kaolin particles. Sodium polyacrylate solution (2%) was added to the third slurry to increase pH to 7.0 and after static aging the sample for several minutes a cloudy supernatant formed at the top indicating poorly flocculated kaolin.

The main portion of bleached slurry was divided into two separate portions for filtration. One portion weighing 5700 g was filtered "as is" on a 24 cm Buchner funnel with vacuum (Whatman #5 paper), and a 1000 ml deionized water rinse followed. The pH of the second portion of bleached slurry was adjusted to 7.0 with sodium hydroxide solution (10% active) with mixing. After 1 hour static aging the clear supernatant that formed at the top of the slurry was gently poured off and discarded and a zero mv zeta potential value was obtained from the flocculated kaolin portion. The flocculated slurry was then divided into three equal portions for filtration on three 24 cm Buchner funnels. Each filtercake was rinsed with 1000 ml of deionized water.

EXAMPLE 2

This example illustrates the use of cationic dispersion in the wet processing of a 50%:50% blend of two Georgia kaolin crudes from mines commonly referred to as Dixie and Califf. The crude blend contains a large number of finely divided kaolin particles and is of the type useful in producing low abrasion calcined kaolin opacifying pigment. A control sample to illustrate conventional anionic wet processing was also prepared. The kaolins were received as crushed crudes. The Dixie sample was at 80.2% solids (19.8% volatiles); and the Califf sample was at 81.6% solids (18.4% volatiles).

Following is a description of the wet processing of the crude blend using cationic primary dispersion.

Deionized water (4930 g) was weighed into a two gallon beaker. Using low speed stirring (300 r.p.m.) provided by a drill press mixer equipped with a 2" uplift stainless steel propeller, 0.60% active Calgon 261LV (44.5% active aqueous solution) based on the dried weight of the crude kaolin was added to the deionized water. Slowly and simultaneously 2500 g of each crude calculated on a dry weight basis (3117 g Dixie and 3064 g Califf) was added to the diluted polymer solution during continuous stirring at a moderate speed. To further disperse the slurry, an additional 0.15% active Calgon 261LV (44.5%) based on the dried weight of the kaolin was added to the slurry and stirring continued for one hour at an increased speed of 1000 r.p.m. The dispersion of the slurry was checked by examining the sediment that formed after permitting the slurry to settle in the beaker overnight. The supernatant portion was poured out and retained and the sediment that had formed was hard and evenly stratified, indicating adequate dispersion in the slurry for degritting and fractionation. The supernatant portion was recombined with the sediment and stirring at 1000 r.p.m. on the drill press followed. The slurry pH was 4.0.

Degritting the acidic cationically dispersed kaolin slurry was carried out by passing it over a 100 mesh (U.S.) sieve. The >100 mesh residue was set aside and the <100 mesh slurry that passed through the sieve was collected and immediately passed over a 325 mesh sieve (U.S.). The >325 mesh residue that collected on top of this sieve was combined with the previously collected >100 mesh residue. This portion was set aside. Yield of the <325 mesh portion was found to be 67% and the slurry solids was 25.2%. A +50 mv zeta potential value on the <325 mesh fraction was obtained with the aid of the Lazer Zee Meter (model 501 Pen Kem Inc.) after diluting a portion of the slurry with deionized water. During moderate stirring on the drill press, the 25.2% solids slurry was diluted to 15% solids with an addition of 8770 g of deionized water and the slurry was dispersed further by adding 0.05% active Calgon 261LV based on the dried weight of the kaolin.

The <325 mesh slurry was then fractionated to extract the <1 micrometer particles (equivalent spherical diameter) by using a conventional gravitational sedimentation method. The slurry was divided equally into two five gallon plastic buckets (having straight walls), and the resulting slurry height in each of the buckets was 19 cm. After permitting the slurries to static settle for 53 hours, the supernatant portions were gently poured out and retained. The hard sediments that had formed on the bottom of the buckets were diluted with deionized water, mixed on the drill press, combined and remixed vigorously on the drill press. The slurry formed from the sediments was at 17.9% solids.

A second gravitational sedimentation was carried out to recover additional <1 micrometer material from the sediments formed by the previous fractionation. The slurry (from sediments) was diluted to 15% solids by adding deionized water during stirring on the drill press. The height of the slurry in the bucket was 21 cm. After permitting the slurry to settle undisturbed for 40 hours, the top 13 cm of supernatant was gently siphoned off and collected in a separate beaker. The supernatants obtained from the first and second gravitational sedimentations were combined and stirred. Yield of the <1 micrometer fraction was found to be 64.0% and the slurry solids measured 7.6%.

The <1 micrometer fraction was upgraded further by passing the slurry through a high intensity magnetic separator Model #WHIMS 3X4L (Carpco Inc.) containing a steel wool matrix. Slurry was passed through the magnet at 100 ml per minute flow rate. The product collected was visually brighter and had a 6.1% solids content and a pH of 4.0.

To improve the brightness of the <1 micrometer fraction of acidic cationically dispersed magnetically purified kaolin slurry, it was bleached with 6 lb. of sodium dithionite reducing bleach based on one ton of dried kaolin. This was performed by sifting bleach powder into the slurry during manual stirring followed by 5 more minutes of stirring. The slurry was then permitted to static age overnight in a covered plastic bucket.

The final step in the cationic wet processing of this sample was to remove excess liquid. Since the solids content in the slurry was only 6.2% and filtration by vacuum in Buchner funnels would consume too much time, the slurry solids was increased to 30.5% before filtration by centrifugation. This was done by centrifuging several portions of the low solids slurry in a SORVALL® SS-3 centrifuge at 9500 r.p.m. until a clear supernatant was obtained. The clear supernatants were poured off and discarded and the sediments formed during centrifugation were mixed into the bleached slurry. The 30.5% solid slurry was then filtered under vacuum on several Buchner funnels by placing 655 g of slurry in each funnel (200 g dry kaolin). Each filter cake was rinsed twice with 200 ml of deionized water.

The rinsed filter cakes were then removed from the funnels and dried at 180° F. for 4 hours. The dried kaolin was then pulverized twice in a MIKRO-SAMPLMILL using the 0.039" round hole screen.

The particle size distribution of the cationically processed hydrous kaolin product was: 92% <2 micrometers, 80% <1 micrometer, 53% <0.5 micrometer, 0% <0.2 micrometer and median size was 0.48 micrometer. Block brightness of the pigment when measured on the Elrepho Reflectance Meter (Carl Zeiss Corp.) was 87.9%.

Preparation of an anionically processed kaolin pigment was carried out for purposes of comparison following the same wet processing steps used to produce the cationic pigment. The processing steps were slurry makedown with a primary dispersant, degritting, fractionating, high intensity magnetic separation, bleaching, filtration, and washing.

In the initial step of a slurry makedown with a primary dispersant, N®Brand sodium silicate (37.7% active aqueous solution) was added to the deionized water in the amount of 0.20% sodium silicate (dry basis) based on the dried weight of the crude kaolin blend (2500 g of Dixie and 2500 g of Califf). The crude kaolin was added to the diluted sodium silicate solution until the slurry solids was 45%. The slurry pH was 8.5. The yield of <325 mesh kaolin after degritting the slurry was 65% and the slurry was 31.1% solids (pH 8.5). Two gravitational sedimentations to obtain the <1 micrometer size kaolin particles were carried out after diluting the 31.1% solids degritted portion to 15% solids with deionized water. After the initial fractionation the sediment was diluted to 15% solids again, however, 0.05% sodium silicate based on the dried weight of the kaolin was added to the slurry to improve dispersion. The slurry pH was 8.4 and the kaolin was sedimented again to recover more of the <1 micrometer particles. The yield of the <1 micrometer fraction was 69.0% based on the <325 mesh portion and the slurry contained 9.0% solids. High intensity magnetic separation followed producing a brighter slurry. The slurry solids were 7.3%. The magneted slurry was further upgraded by dithionite bleaching. Since the slurry pH was 7.9 and dithionite bleaching is most effective in acidic systems, the slurry pH was adjusted to 3.0 by adding sufficient sulfuric acid (10% active solution) prior to the addition of bleach. Bleaching with sodium dithionite in an amount equivalent to 6 lb. per ton of dried kaolin was carried out by adding the bleach to the slurry while stirring. The pH of the bleached slurry after static aging overnight was 3.5. To remove the liquid phase from the slurry, it was filtered under vacuum on several Buchner funnels (2700 g per funnel) and the filter cakes were rinsed twice with 200 g of deionized water (2:1 rinse). The filter cakes were removed from the funnels and dried at 180° F. for 4 hours. Pulverization of the dried filter cakes followed by passing them twice through the MIKRO-SAMPLMILL.

The particle size distribution of the anionically processed hydrous kaolin product was: 98% <2 micrometers, 96% <1 micrometer, 82% <0.5 micrometer, 36% <0.2 micrometer, and the median size was 0.25 micrometer. Block brightness of the pigment when measured on the Elrepho Reflectance Meter was 87.2%.

EXAMPLE 3

This example illustrates the use of a cationic primary dispersant in the wet processing of a Georgia kaolin crude from a mine commonly referred to as Dixie. A control sample to illustrate conventional anionic wet processing was also prepared. As in Example 2, the crude used contains a large number of finely divided kaolin particles and is of the type useful in producing low abrasion calcined kaolin opacifying pigments. The Dixie crude was received as a crushed crude containing 80.2% solid materials (19.8% volatiles).

The use of a primary cationic dispersant in wet processing is described first.

The crude kaolin was made down in a slurry form at 45% solids as follows. Deionized water (4876 g) was weighed into a two gallon plastic beaker. Using low speed stirring (300 r.p.m.) provided by a drill press mixer equipped with a 2" uplift stainless steel propeller, 0.53% active Calgon 261 LV (44.5% solids) based on the weight of the dried kaolin was added to deionized water. Slowly and continuously 6235 g of Dixie crude (5000 g dry) was added to the diluted polymer solution during continuous stirring at a moderate speed (600 r.p.m.). After all of the crude was added, the stirring speed was increased to and maintained at 1000 r.p.m. for one hour. The dispersion of the slurry was checked by examining the sediment that formed after permitting the slurry to settle in the beaker overnight. The supernatant was poured out and retained and the sediment that had formed was hard and uniformly stratified, indicating adequate dispersion of the slurry for degritting and fractionating. The supernatant was recombined with the sediment and stirring at 1000 r.p.m. followed. The slurry was pH was 4.0.

Degritting the acidic cationically dispersed kaolin slurry was carried out by first passing it over a 100 mesh (U.S.) sieve The >100 mesh residue was set aside and the <100 mesh slurry that passed through the sieve was collected and immediately passed over a 325 mesh (U.S.) sieve. Deionized water was used to rinse both of the sieves after which the two residues were recombined and set aside. Yield of the <325 mesh portion was found to be 86.9% and the slurry solids was 26.4%.

The degritted crude was then prepared for fractionating by a conventionally used gravitational sedimentation method to obtain only the finely divided particles measuring <1 micrometer (equivalent spherical diameter) in size. During moderate speed stirring on the drill press, the 26.4% solids cationically dispersed slurry was diluted to 15% solids with deionized water. The slurry was then divided equally into two straight walled five gallon plastic buckets which gave a 21 cm slurry height in each. After static settling the slurries for 53 hours, the top 17.5 cm of supernatant was siphoned off and retained. The hard sediments that had formed at the bottom of each bucket were diluted with deionized water to 15% solids, redispersed on the drill press mixer, recombined and then remixed at 1000 r.p.m. by the drill press. The height of the slurry in the bucket was 20 cm and pH was 4.0. To recover more fine material, the slurry was permitted to settle for 40 hours and the top 13 cm of supernatant was siphoned off and combined with the supernatant retained from the previous sedimentation. Yield of <1 micrometer material was found to be 63.8%.

The final step of cationically wet processing this sample was to remove the excess liquid. Since the volume of the slurry was large and the solids content low and filtration by vacuum in Buchner funnels would take a long time, the slurry solids was increased by centrifuging several portions of the slurry in the SORVALL centrifuge at 9500 r.p.m. until clear supernatants were obtained. The clear supernatants were poured out and discarded and the sediments formed during centrifugation were mixed into the original slurry, thereby increasing its solids content. This higher solids slurry was then filtered under vacuum on several Buchner funnels, in an amount equal to 200 g of dried kaolin.

The filter cakes were removed from the funnels and dried at 180° F. for 4 hours and double pulverization in a MIKRO-SAMPLMILL using the 0.039" round hole screen followed.

The particle size distribution of the cationically processed hydrous kaolin product was: 95% <2 micrometers, 81% <1 micrometer, 50% <0.5 micrometer, 0% <0.2 micrometer, and the median size was 0.50 micrometer. Block brightness of the pigment was 85.4%.

For purposes of comparison, an anionically processed pigment was prepared by following the same wet processing steps used to produce the previously made cationic pigment, but using an anionic primary dispersant. Processing steps included slurry makedown with a primary dispersant, degritting, fractionating, and filtering. Processing sequence, equipment, addition rates, and mixing speeds to process the anionically dispersed system were the same as those used for the previously processed cationically dispersed system.

In the initial step of slurry makedown with a primary dispersant, sodium silicate (37.7% active aqueous solution) was added to the deionized water in the amount of 0.20% based on the dried weight of the crude kaolin (5000 g). The crude kaolin was added to the diluted sodium silicate solution which resulted in 45% solids slurry and the slurry pH was 8.6. After degritting, the <325 mesh yield was 83.2% and the slurry contained 33.3% solids. Two gravitational sedimentations to obtain the <1 micrometer size kaolin particles were carried out by diluting the degritted slurry to 15% solids with deionized water. After the initial fractionation the sediment was diluted to 15% solids and the slurry was settled again. Yield of the combined fine fractions was 64.1% and the pH of the slurry was 8.3. The next step in processing was to remove the excess liquid by filtration. To speed filtration, the fine fraction slurry was flocculated by adding sulfuric acid (10% active solution) in an amount sufficient to reduce the pH to 3.5. After permitting the flocculated slurry to stand overnight, the kaolin flocs settled and the clear supernatant was poured out and discarded. The concentrated slurry was then filtered on several Buchner funnels (200 g dry kaolin each). Each filtercake was rinsed twice with 200 ml of deionized water after which they were dried at 180° F. for 4 hours and pulverized with two passes through the MIKRO-SAMPLMILL using the 0.039" round hole screen.

The particle size distribution of the anionically processed hydrous kaolin product was: 98% <2 micrometers, 93% <1 micrometer, 75% <0.5 micrometer, 33% <0.2 micrometer, and the median size was 0.28 micrometer. Block brightness was 85.7%.

EXAMPLE 4

Tests were carried out to compare the effect of cationic and anionic wet processing on the properties of calcined kaolin opacifying pigment obtained by calcining kaolin products obtained in Examples 2 and 3. The objective was to determine whether cationic processing would influence significant properties of the calcined pigment such as brightness, opacification, abrasion and printing properties.

Abrasiveness of pigment slurries was measured using the "Einlehner" AT-1000 tester. This test measures weight loss of bronze fourdrinier wire when subjected to the rubbing action of a plastic abrader immersed in the pigment slurry. Results are expressed as mg of weight lost per 100,000 revolutions of the abrader. Complete details of the test are given by Neubold, Sennett and Morris, "Abrasiveness of pigments and extenders", Tappi Journal, Dec. 1982, p. 90.

The "needle" abrasion test is designed to measure the abrasivity of pigment coated or filled paper. In this test, the weight loss of a brass needle is measured after a known number of penetrations of a brass needle through the paper. A complete description of the method is given by Kurrle, "Correlation of IPC needle penetration test with guillotine trimmer knife life", Tappi Journal, July 1980, p. 100.

Samples of wet processed, dried and pulverized fine fractions of the kaolin from Example 2 (Dixie/Califf crude) and Example 3 (Dixie crude) were used in the tests.

Portions of the dried and double pulverized fine fractions were calcined in laboratory muffle furnaces preheated to 1680° F. or 1980° F. The 100% Dixie fractions (anionic and cationic processed) of Example 3 were treated at 1680° F. for 40 minutes in an attempt to yield 90% block brightness products and the 50% Dixie/50% Califf magnetically treated and bleached fractions (anionic and cationic processed) were calcined at 1980° F. for 40 minutes to yield 93% block brightness products. All of the calcined products were then pulverized in the MIKRO-SAMPLMILL, 1 pass through the 0.039" round hold screen.

All four calcined, repulverized products were initially made down at low shear into 50% solids slurries with deionized water and 0.10% polyacrylate (C211) dispersant, followed by high shear mixing on the Waring Blendor ® mixer for 1 minute. Additional dispersant was added to each slurry until a minimum Brookfield viscosity was obtained. Each optimally dispersed slurried sample was then incorporated into a rotogravure paper coating. The coating formulations prepared at 57% solids contained: 85 parts Nuclay ® hydrous kaolin, 15 parts calcined clay, 7 parts Penford Gum ® 280 starch, 4 parts Dow 620A latex, and 0.5 parts Nopcote ® C-104 calcium stearate emulsion (all parts on dry basis). All coatings were finally adjusted to pH 8.0 with dilute ammonium hydroxide.

Coating weights of 4.4, 5.5, and 6.7 pounds coating per 3300 square feet of paper for each coating was applied to the wire side of a light weight (25#/ream) publication base stock paper with the aid of the Dow blade coater. Paper optical and print properties were determined using conventional techniques on sheets supercalendered 2 nips at 260 pli and 140° F.

TABLE I lists physical properties of the processed 100% Dixie crudes from Example 3. Particle size distribution of the cationic calciner feed shows no particles with diameters less than 0.2 micrometer while the anionic calciner feed has a considerable amount of these particles. Calcination of the two feeds at 1680° F. for 40 minutes resulted in block brightness increases for the cationic material from 85.4% to 89.8%, a 4.4 point improvement, and for the anionic material from 85.7% to 88.5%, a 2.8 point improvement.

Also shown in TABLE I is that high shear mixed and optimally dispersed slurries prepared at 50% solids content for both systems had equivalent slurry pH and Brookfield viscosity. Hercules viscosity of the cationically calcined clay product was improved. Films laid on black glass plates from 30% solids slurries (diluted 50% solids slurries) showed a 64% gloss for the cationically processed calcined material and a 70% gloss for the anionically processed calcined material. Light scattering coefficients of both systems were virtually the same.

An Einlehner abrasion of 6 mg loss/100,000 revolutions for the cationically processed calcined products was 33% lower than the 9 mg loss/100,000 revolutions value obtained for the anionically processed calcined product.

Surprisingly, particle size distribution for the cationically processed calcined product was considerably coarser than the anionically processed product in spite of the fact that it was less abrasive.

TABLE II lists physical properties of the processed 50%/50% blend of Dixie/Califf crudes (Example 2). Particle size distribution of the cationic calciner feed show no particles with diameters less than 0.2 micrometers while the anionic calciner feed has a considerable amount of these particles. Block brightness was marginally better for the cationic calciner feed (87.9%) than the anionic calciner feed (87.2%).

Calcining both materials increased their block brightness values to 93.0%. High sheared optimally dispersed 50% solids content slurries for both systems had equal slurry pH and Brookfield viscosity. Hercules viscosity was better for the cationically processed calcined product. Films laid on black glass plates from 30% solids slurries (diluted 50% solid slurries) had 57% gloss for the cationically processed calcined material and 65% gloss for the anionically processed calcined material. Light scattering coefficients of both systems were the same. Einlehner abrasion of 20 mg value obtained for the cationically processed calcined product was 30% lower than the 29 mg loss/100,000 revolutions value obtained for the anionically processed calcined product. However, needle abrasion was higher. Particle size distribution for the cationically processed calcined product was considerably coarser than the anionically processed calcined product.

TABLE III lists optical properties obtained from supercalendered sheets coated at 4.4, 5.5, and 6.7 lb/3300 ft² with 15 parts of each of the four calcined pigments and 85 parts Nuclay starch/latex coating formulations on a 25#/ream base stock. No significant differences in sheet gloss, brightness and opacity at equivalent coating weights were observed.

TABLE IV lists printing properties for the same supercalendered coated sheets. The test procedures used are known in the industry and are described or cited in U.S. Pat. No. 4,738,726, Pratt,.et al supra. All four calcined products exhibit equal IGT dry pick strength at equal coating weights. However, Heliotest data showed cationically processed calcined products had significantly better rotogravure printability than anionically processed calcined products.

Chemical compositions determined on the calcined products are listed in TABLE V. The cationically processed materials had marginally lower amounts of titanium dioxide and calcium oxide than the anionic materials which may be due to the differences in particle size distribution between the two.

In conclusion, overall evaluation of all systems show greater improvements in rotogravure printability and Einlehner abrasion for kaolins processed cationically before calcination than ones processed anionically.

While this invention has been described with particular emphasis on its application to upgrading kaolin ores, it will be understood that principles of the invention can be applied to upgrading other ores such as other silicate or aluminous ores and carbonate ores. When processing carbonate ores such as calcitic or dolomitic ores the pH during primary dispersion should be sufficiently high to avoid decomposition of the ore.

TABLE I

Physical Properties of 100% Dixie Fine Fraction Kaolins Processed Anionically and Cationically.

DIXIE

| PROPERTIES | ANIONIC PROCESS | CATIONIC PROCESS |
|---|---|---|
| HYDROUS KAOLIN | | |
| Particle size distribution, e.s.d. | | |
| wt. % less than 2 micrometers | 98 | 95 |
| wt. % less than 1 micrometer | 93 | 81 |
| wt. % less than 0.5 micrometer | 75 | 50 |
| wt. % less than 0.2 micrometer | 33 | 0 |
| median (micrometers) | 0.28 | 0.50 |
| Block Brightness, % | 85.7 | 85.4 |
| CALCINED KAOLIN | | |
| Temp./Time | 1680° F./ 40 min. | 1680° F./ 40 min. |
| Block Brightness, % | 88.5 | 89.8 |
| 50% Solids highly sheared slurries | | |
| % C211 (polyacrylate) dispersant | 0.200 | 0.175 |
| slurry pH | 6.1 | 6.0 |
| Brookfield viscosity | | |
| cps @ 10 rpm | 40 | 36 |
| cps @ 20 rpm | 38 | 36 |
| cps @ 100 rpm | 58 | 58 |
| Hercules viscosity rpm/dyne-cm × $10^5$ | 360/16 | 580/16 |
| 30% Solids slurries | | |
| black glass evaluation | | |
| 75° gloss (%) | 70 | 64 |
| S457* $m^2/kg$ | 218 | 227 |
| S577* $m^2/kg$ | 132 | 142 |
| Einlehner Abrasion (mg/100,000 revolutions) | 9 | 6 |
| Particle size distribution, e.s.d. | | |
| % less than 2 micrometers | 98 | 92 |
| % less than 1 micrometer | 84 | 71 |
| % less than 0.5 micrometer | 24 | 19 |
| % less than 0.2 micrometer | 0 | 0 |
| median (micrometer) | 0.64 | 0.74 |

*Light scattering at the indicated wavelength (457 or 577 nanometers).

TABLE II

Physical Properties of 50% Dixie/50% Califf Fine Fraction Kaolins Processed Anionically and Cationically.

50% DIXIE:50% CALIFF

| PROPERTIES | ANIONIC PROCESS | CATIONIC PROCESS |
|---|---|---|
| HYDROUS KAOLIN | | |
| Particle size distribution, e.s.d. | | |
| wt. % less than 2 micrometers | 98 | 92 |
| wt. % less than 1 micrometer | 96 | 80 |
| wt. % less than 0.5 micrometer | 82 | 53 |
| wt. % less than 0.2 micrometer | 36 | 0 |
| median (micrometers) | 0.25 | 0.48 |
| % Block Brightness | 87.2 | 87.9 |
| CALCINED KAOLIN | | |
| Temp./Time | 1980° F./ 40 min. | 1980° F./ 40 min. |
| % Block Brightness | 93.0 | 93.0 |
| 50% Solids highly sheared slurries | | |
| % C211 disp. on clay | 0.150 | 0.125 |
| slurry pH | 5.7 | 5.6 |
| Brookfield viscosity | | |
| cps @ 10 rpm | 44 | 40 |
| cps @ 20 rpm | 40 | 38 |
| cps @ 100 rpm | 70 | 69 |
| Hercules viscosity rpm/dyne-cm × $10^5$ | 515/16 | 1035/16 |
| 30% Solids slurries | | |
| black glass evaluation | | |
| 75° gloss (%) | 65 | 57 |
| S457* $m^2/kg$ | 266 | 261 |
| S577* $m^2/kg$ | 169 | 171 |
| Einlehner Abrasion (mg/100,000 revolutions) | 29 | 20 |
| Needle Abrasion (mg) | 370 | 480 |
| Particle size distribution | | |
| % less than 2 micrometers | 95 | 86 |
| % less than 1 micrometer | 76 | 65 |
| % less than 0.5 micrometer | 16 | 9 |
| % less than 0.2 micrometer | 0 | 0 |
| median (micrometers) | 0.72 | 0.80 |

*Light scattering at the indicated wavelength (457 or 577 nanometers).

TABLE III

Optical Properties of Anionically and Cationically Processed Calcined Kaolins Coated on 25 lb. Lightweight Publication Base Stock Paper

| | 100% DIXIE CALCINED AT 1680° F. | | | | | | 50% DIXIE/50% CALIFF CALCINED AT 1980° F. | | | | | |
|---|---|---|---|---|---|---|---|---|---|---|---|---|
| | ANIONIC PROCESS coating weight (#/3300 sq. ft.) | | | CATIONIC PROCESS coating weight (#/3300 sq. ft.) | | | ANIONIC PROCESS coating weight (#/3300 sq. ft.) | | | CATIONIC PROCESS coating weight (#/3300 sq. ft.) | | |
| OPTICAL PROPERTIES | 4.3 | 5.5 | 6.7 | 4.4 | 5.5 | 6.7 | 4.4 | 5.4 | 6.7 | 4.4 | 5.6 | 6.7 |
| 75° GLOSS (%) | 35.3 | 43.5 | 52.4 | 36.8 | 44.9 | 53.8 | 37.9 | 45.6 | 54.0 | 37.8 | 45.1 | 52.5 |
| BRIGHTNESS (%) | 75.7 | 76.6 | 77.4 | 75.7 | 76.5 | 77.4 | 76.1 | 76.9 | 77.6 | 75.9 | 76.9 | 77.5 |
| OPACITY (%) | 85.4 | 86.8 | 88.2 | 85.4 | 86.6 | 87.8 | 85.6 | 86.7 | 88.1 | 85.1 | 86.4 | 88.0 |

TABLE IV

Printing Properties of Anionically and Cationically Processed Calcined Kaolins Coated on 25 lb. Lightweight Publication Base Stock Paper

| | 100% DIXIE CALCINED AT 1680° F. | | | | | | 50% DIXIE/50% CALIFF CALCINED AT 1980° F. | | | | | |
|---|---|---|---|---|---|---|---|---|---|---|---|---|
| | ANIONIC PROCESS coating weight (#/3300 sq. ft.) | | | CATIONIC PROCESS coating weight (#/3300 sq. ft.) | | | ANIONIC PROCESS coating weight (#/3300 sq. ft.) | | | CATIONIC PROCESS coating weight (#/3300 sq. ft.) | | |
| PRINTING PROPERTIES | 4.3 | 5.5 | 6.7 | 4.4 | 5.5 | 6.7 | 4.4 | 5.4 | 6.7 | 4.4 | 5.6 | 6.7 |
| IGT DRY PICK (vvp) | 3.0 | 3.4 | 3.8 | 3.2 | 3.6 | 4.0 | 3.2 | 3.4 | 4.0 | 3.0 | 3.6 | 4.2 |
| HELIOTEST (cm to 20th missing dot) | 2.6 | 3.6 | 5.5 | 3.6 | 4.4 | 6.7 | 3.4 | 4.3 | 7.4 | 4.2 | 4.8 | 8.8 |

TABLE V

| | Chemical Composition of Cationically and Anionically Processed Calcined Products | | | |
| --- | --- | --- | --- | --- |
| | 100% DIXIE 1680° F./40 min. | | 50% DIXIE/50% CALIFF 1980° F./40 min. | |
| COMPONENT* | ANIONIC PROCESS (wt. %) | CATIONIC PROCESS (wt. %) | ANIONIC PROCESS (wt. %) | CATIONIC PROCESS (wt. %) |
| $SiO_2$ | 52.9 | 53.5 | 53.3 | 53.1 |
| $Al_2O_3$ | 44.5 | 44.8 | 44.7 | 44.9 |
| $Fe_2O_3$ | 0.96 | 0.96 | 0.90 | 0.88 |
| $TiO_2$ | 1.50 | 1.41 | 1.38 | 1.27 |
| CaO | 0.14 | 0.02 | 0.09 | 0.01 |
| $K_2O$ | 0.20 | 0.12 | 0.11 | 0.11 |
| $Na_2O$ | 0.16 | 0.17 | 0.18 | 0.18 |
| MgO | 0.07 | 0.06 | 0.09 | 0.09 |
| $P_2O_5$ | 0.04 | 0.05 | 0.04 | 0.03 |

*After ignition at 1832° F.

We claim:

1. A process for wet processing a kaolin crude which comprises blunging said kaolin crude in water to form an aqueous pulp, dispersing said kaolin particles in said pulp by adding to said pulp a dispersant consisting essentially of a cationic polyelectrolyte in amount sufficient to impart a positive zeta potential thereto, said cationically dispersed pulp having an acidic pH, removing grit from said cationically dispersed pulp, centrifuging the resulting cationically dispersed pulp to separate at least one fine particle size fraction having a desired content of particles finer than 2 micrometers and adding a bleach reagent to the cationically dispersed pulp at an acidic pH before or after centrifugation, whereby said crude is degritted, fractionated and bleached all at an acidic pH.

2. The process of claim 1 wherein no anionic dispersant is present at any point in the process.

3. The process of claim 1 wherein the pH of said pulp is in the range of 3 to 5.

4. The process of claim 1 wherein said cationic dispersant is a polyelectrolyte.

5. The process of claim 1 wherein said polyelectrolyte is a quaternary ammonium polymer salt.

6. The process of claim 1 wherein said polyelectrolyte is a diallyl ammonium polymer salt.

7. The slurry of claim 1 wherein said polyelectrolyte is a diallyl ammonium polymer salt having a molecular weight between $1 \times 10^4$ to $1 \times 10^6$.

8. The process of claim 1 wherein said polyelectrolyte has a molecular weight between about 50,000 and 250,000.

9. The process of claim 1 wherein the dispersant consists of a diallyl ammonium polymer salt used in amount sufficient to impart a positive zeta potential to said kaolin, said pulp has a pH in the range of about 3 to 5 during said processing, and said bleach is a dithionite salt.

10. The process of claim 9 wherein said pulp is fractionated and the fine particle size fraction is bleached at high solids and then spray dried without prior filtration to provide a cationically dispersed grade of kaolin clay.

11. The process of claim 9 wherein said fine particle size fraction is bleached with a dithionite salt in a pulp at low solids and said pulp is flocculated before or after bleaching by adding an anionic electrolyte, and the flocculated pulp is filtered to produce a filter cake which is redispersed by adding an anionic or cationic electrolyte to form a high solids slurry.

12. The process of claim 11 wherein said anionic electrolyte added as a flocculant is a polyacrylate, a condensed phosphate salt, an alkali metal silicate or combinations thereof, and the anionic electrolyte added to redisperse said pulp is a polyacrylate, a condensed phosphate salt, an alkali metal silicate or combination thereof.

13. The process of claim 3 wherein said fine particle size fraction is bleached in a pulp at low solids and said pulp is flocculated by adding an anionic electrolyte, and the flocculated pulp is filtered to produce a filter cake which is redispersed by adding a cationic polyelectrolyte to form a high solids slurry.

14. A method for producing a bleached cationically dispersed fine particle size kaolin product which comprises blunging crude kaolin clay in water in the presence of a cationic polyelectrolyte to produce an acidic dispersed clay pulp, removing grit from said pulp and then fractionating the degritted pulp to recover a fine particle size fraction having a greater content of particles finer than 2 micrometers than is present in the degritted kaolin, bleaching said fine particle size fraction kaolin clay with a dithionite bleach reagent, and recovering bleached fine particle size kaolin, said degritting, fractionation and said bleaching all taking place while said clay is cationically dispersed in a pulp having an acidic pH.

15. The process of claim 14 in which said crude clay is degritted, fractionated and bleached at a clay solids content of at least about 40% and the pulp of bleached clay is spray dried without filtration.

16. The process of claim 14 wherein said clay solids is at least about 50%.

17. The process of claim 15 wherein said pulp of bleached clay is diluted with water containing anionic material in an amount sufficient to flocculate the pulp which is filtered to produce a filter cake, and said filter cake is redispersed to produce a dispersed slurry of fine particle size bleached kaolin.

18. The process of claim 17 wherein said pulp is flocculated with a polyacrylate, condensed phosphate salt, alkali metal silicate or combinations thereof.

19. The process of claim 17 wherein said filter cake is redispersed by adding polyacrylate salt.

20. The process of claim 17 wherein said filter cake is redispersed by adding a cationic polyelectrolyte.

* * * * *